United States Patent
Smith (10) Patent No.: US 7,500,038 B2
(45) Date of Patent: Mar. 3, 2009

(54) RESOURCE MANAGEMENT

(75) Inventor: Dave Smith, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 653 days.

(21) Appl. No.: 11/119,345

(22) Filed: Apr. 29, 2005

(65) Prior Publication Data

US 2005/0246340 A1   Nov. 3, 2005

(30) Foreign Application Priority Data

Apr. 30, 2004   (EP) ................................. 04252560

(51) Int. Cl.
*G06F 13/00*   (2006.01)

(52) U.S. Cl. .......................... 710/244; 710/28

(58) Field of Classification Search ................. 710/244, 710/309, 310, 113, 116, 118, 22, 28, 52, 710/57
See application file for complete search history.

(56) References Cited

U.S. PATENT DOCUMENTS

| | | | |
|---|---|---|---|
| 5,983,299 A | | 11/1999 | Qureshi |
| 6,546,451 B1 | | 4/2003 | Venkataraman et al. |
| 6,996,640 B1 | * | 2/2006 | Hill et al. ........................ 710/56 |
| 7,106,098 B1 | * | 9/2006 | Zack et al. ...................... 326/40 |
| 7,161,849 B1 | * | 1/2007 | Lowe et al. ............. 365/189.05 |
| 2002/0128812 A1 | * | 9/2002 | Gooding et al. ............... 703/23 |
| 2005/0091470 A1 | * | 4/2005 | Pande ........................... 711/217 |
| 2005/0286507 A1 | * | 12/2005 | Sterling et al. .............. 370/363 |
| 2006/0076988 A1 | * | 4/2006 | Kessels et al. .............. 327/144 |
| 2007/0186071 A1 | * | 8/2007 | Bellows et al. .............. 711/167 |

FOREIGN PATENT DOCUMENTS

GB   2 331 676 A   5/1999

OTHER PUBLICATIONS

European Search Report from European Patent Application 04252560.0, filed Apr. 30, 2004.

* cited by examiner

*Primary Examiner*—Glenn A Auve
(74) *Attorney, Agent, or Firm*—Lisa K. Jorgenson; James H. Morris; Wolf, Greenfield & Sacks, P.C (57) ABSTRACT

A resource management system including a plurality of requester elements competing to access a resource through an arbiter element that controls access to the resource by the requester elements. A requester element having a buffer unit and first and second counters, which are compared to determine if a request having an identified priority type is in the buffer unit.

17 Claims, 7 Drawing Sheets

| Decimal | Gray | Straight Binary |
|---|---|---|
| 0 | 0000 | 0000 |
| 1 | 0001 | 0001 |
| 2 | 0011 | 0010 |
| 3 | 0010 | 0011 |
| 4 | 0110 | 0100 |
| 5 | 0111 | 0101 |
| 6 | 0101 | 0110 |
| 7 | 0100 | 0111 |
| 8 | 1100 | 1000 |
| 9 | 1101 | 1001 |
| 10 | 1111 | 1010 |
| 11 | 1110 | 1011 |
| 12 | 1010 | 1100 |
| 13 | 1011 | 1101 |
| 14 | 1001 | 1110 |
| 15 | 1000 | 1111 |

RESOURCE MANAGEMENT

BACKGROUND OF THE INVENTION

1. Field of the Invention

The present invention relates to resource management, in particular, but not exclusively in a transaction-based communication system wherein a number of requester elements are attempting to access a single resource.

2. Discussion of the Related Art

Figure 1:
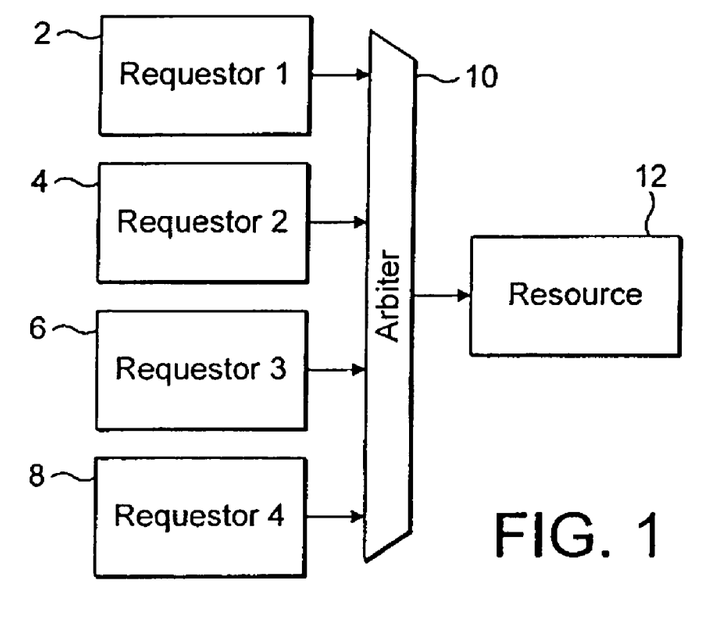
FIG. 1 shows a transaction-based communication system.
Figure 2:
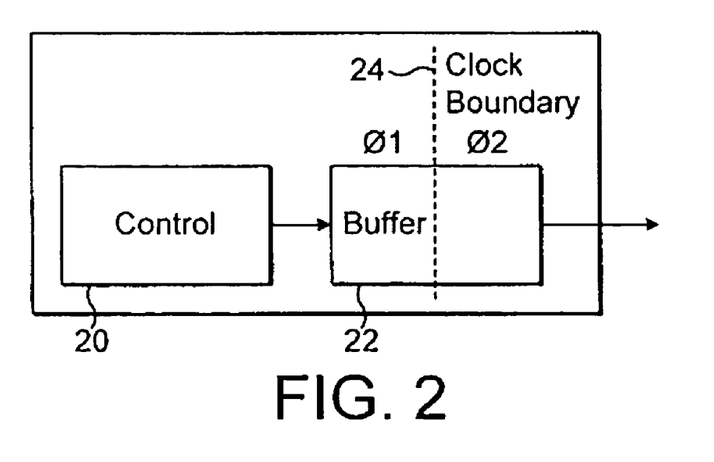
FIG. 2 shows the internal detail of a requester element.

FIG. 1 shows an example of a routed transaction-based communication system which comprises a plurality of requester elements 2, 4, 6, 8 connected through an arbiter element 10 to a single resource 12. That is, in a transaction-based communication system each requester element supplies requests for accessing the single resource 12. Only one requester element can access the resource at any one time, and therefore the arbiter element 10 controls which requester element 2, 4, 6, 8 can have access to the resource. As shown in FIG. 2, each of the requester elements comprises a control unit 20 for generating requests and a buffer unit 22 having a plurality of storage locations for buffering the generated requests before these are sent on to the arbiter element 10.

Figure 1A:
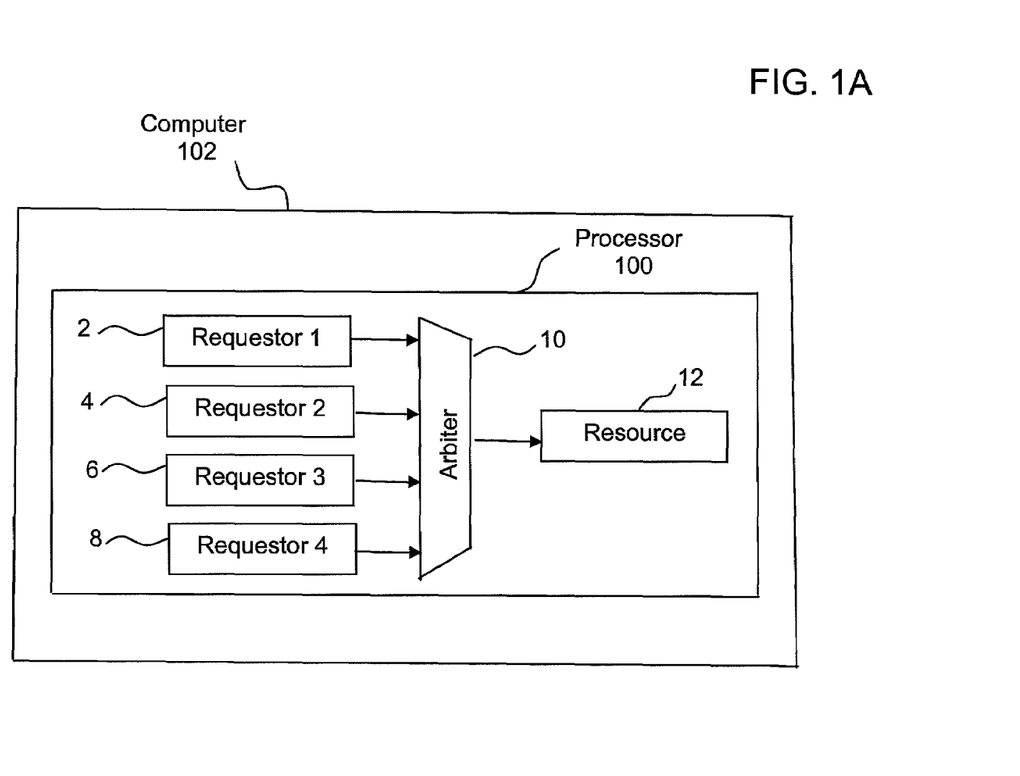
Figure 1B:
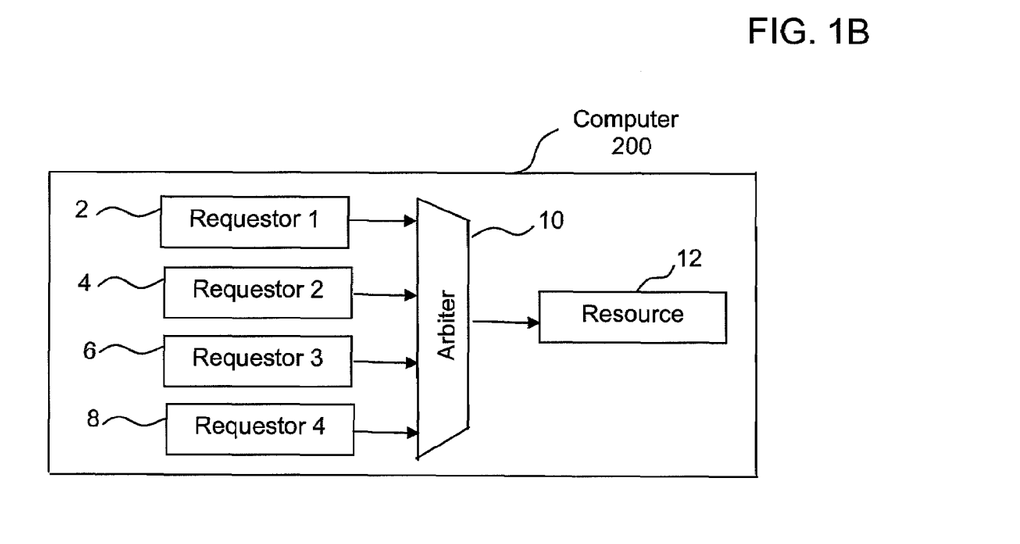

Such a transaction-based communication system has many different potential applications. For example, one could consider that each of the requester elements represent different processing units in a computer system and are each competing to access a particular memory location (i.e. the resource 12) over a communication bus (managed by the arbiter element 10). FIG. 1A shows one such example of a computer 102 comprising a processor 100 that itself comprises a plurality of requester elements 2, 4, 6, 8 competing for a shared resource 12, and FIG. 1B shows another example of a computer 102 comprising a plurality of requester elements 2, 4, 6, 8 competing for a shared resource 12.

Figure 1C:
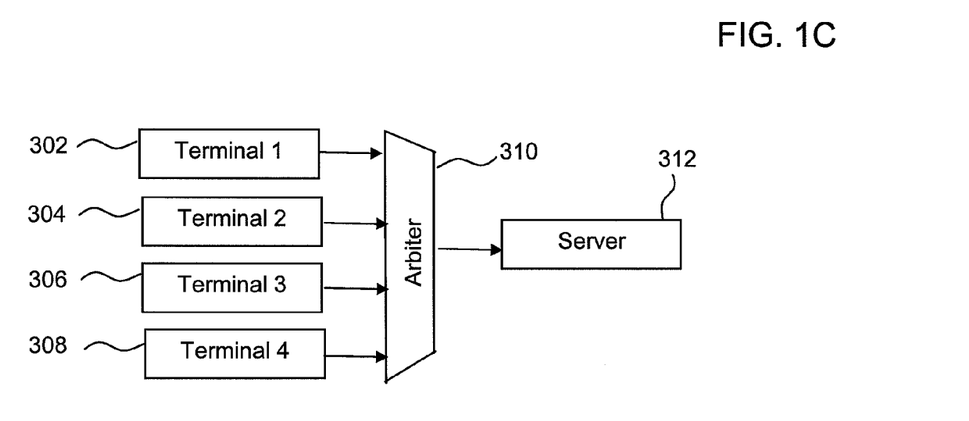

Another example, taken at a higher level, is if each of the requester elements is considered to be a client terminal that forms part of a client-server network wherein the resource 12 is the server terminal which the client terminals are trying to access over a communication network (involving arbiter 10). FIG. 1C shows one such example of a plurality of terminals 302, 304, 306, 308 competing to access a server 312. It will be appreciated that these are two very simple examples and that in practice the present invention can be applied to a variety of applications.

Each requester element 2, 4, 6, 8 is capable of performing a number of different tasks of varying priority. That is, a task having a high-priority needs to be serviced as soon as possible, whereas a task having a low-priority is not so urgent. In addition, some tasks may require a large number of accesses to the resource, but at a low-priority, whereas other tasks may require only a single access to the resource, but the access must be granted almost immediately.

Therefore, the control unit 20 which generates requests for each requester element 2, 4, 6, 8 provides some extra priority information along with the generated access request to indicate how urgent the request is. The arbiter element 10 can then use this priority information in its decision as to which request should be allowed to access the resource.

FIG. 2 shows the internal details of one of the requester elements 2, 4, 6, 8 as comprising a control unit 20 for generating requests which are stored in the buffer unit 22. The buffer unit 22 crosses the boundary indicated by the line 24 between two clock domains such that the clocks on either side of the buffer are unrelated and asynchronous. That is, the requests are clocked into the buffer under control of a first rate $\phi^1$ (related to the rate of the control unit 20) and are clocked out of the buffer under control of a second clock rate $\phi_2$ (related to the handling rate of the arbiter unit 10).

The buffer unit is able to store a number of requests which it then passes on to the arbiter element 10. The buffer unit 22 forwards on the requests to the arbiter in the same order in which it received them, that is on a first-in first-out (FIFO) basis.

However, the limitations of the circuit of FIG. 2 become apparent when one considers what happens when the control unit 20 generates a large number of low-priority access requests followed by a high-priority request. In this case, the buffer unit 22 of one of the requester elements, for example the second requester 4 of FIG. 1, will pass the first low-priority request to the arbiter 10, but this request may not be granted access to the resource if another requester element, for example the fourth requester 8, has a medium-priority request in progress. In fact, access may not be granted to the requester 4 for a long time, especially if other requesters 2, 6, 8 supply a continual stream of medium-priority transactions. This is not optimal since the requester 4 will have a high-priority request which is waiting at the back of the buffer unit.

Therefore, it is an aim of the embodiment of the present invention to manage high priority requests.

Figure 3:
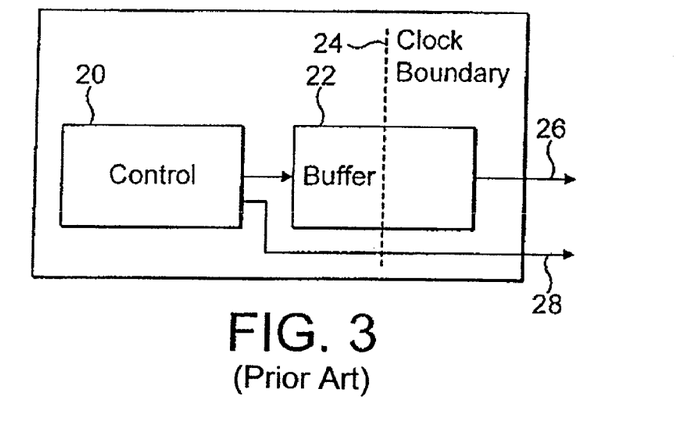
FIG. 3 shows a first prior art system which uses direct control of priority pins.

FIG. 3 shows a first known system which attempts to address this problem wherein the control unit 20 is shown to have direct control over a signal 28 which communicates the priority of the request to the arbiter element 10. For this system, as soon as the control unit 20 generates a high-priority transaction in the buffer unit 22, it raises the high-priority signal on line 28 to signal the arbiter to accept the request. However, the drawback of this system is that the control unit 20 does not have the visibility to check when the high-priority request has actually been read out of the buffer unit 22 and passed on to the arbiter element 10.

Therefore, it is difficult to decide exactly when to deassert the high-priority signal on line 28, since if the signal is disasserted too early then the high-priority request in the buffer unit 22 can be held up unnecessarily since the arbiter element 10 will not be aware that the high-priority request is still in the queue. On the other hand if the high-priority signal on line 28 is disasserted too late then other low-priority transactions will be given a high priority status which they do not require, allowing them access to the arbiter element 10 at the expense of other requester elements which might contain higher-priority requests.

Figure 4:
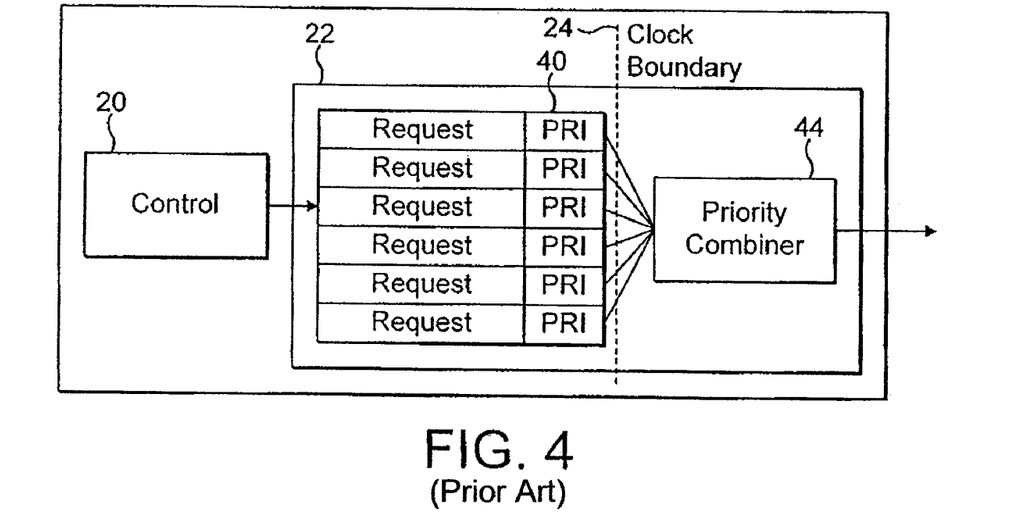
FIG. 4 shows a second prior art system which uses a buffer-based solution.

FIG. 4 shows a second known system. A priority value 40 is placed into the buffer unit 22 along with the corresponding request. The buffer unit 22 also has a priority combiner 44 which continuously scans the priority value 40 corresponding to every request in the buffer and indicating a high-priority request to the arbiter element whenever there are any high-priority requests in the buffer. However, it can be seen from FIG. 4 that the memory structure of the buffer unit needs modification since a priority value needs to be stored along with the request itself. Because the priority combiner 44 requires direct access to the priority value 40 of every single request in the buffer unit 22, the priority value cannot be held in a standard memory or macro. Therefore, the priority value must be stored in separate flip-flops thereby increasing the silicon area requirement and the cost of the memory device.

A further disadvantage of the system shown in FIG. 4 is that the priority combiner 44 and the buffer unit 22 cross the two clock domains $\phi_1$, $\phi_2$, which introduces both synchronization and metastability issues which could result in some of the requests being allocated the wrong priority value.

SUMMARY OF THE INVENTION

It is an aim of the present invention to manage high priority requests to a resource more efficiently.

According to one aspect of the present invention there is provided a resource management system comprising a plurality of requester elements competing to access a resource through an arbiter element that controls access to the resource by the requester elements, at least one of the requester elements comprising: a control unit for generating requests, each request having a priority type selected from a plurality of different priority types for accessing the resource; a buffer unit connected to receive the generated requests from the control unit wherein requests are received into the buffer at a first clock signal and requests are written out of the buffer to the arbiter element at a second clock signal; a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

According to a further aspect of the present invention there is provided a method for managing access to a resource wherein a plurality of requester elements are competing to access the resource through an arbiter element that controls access to the resource, the method comprising: generating requests in each requester element to access the arbiter element, each request having a priority type selected from a plurality of different priority types for accessing the resource; receiving the generated requests at a buffer in at least one requester element, wherein requests are received into the buffer at a first clock signal and requests are written out of the buffer to the arbiter element at a second clock signal; changing state of a first counter whenever a request having an identified priority type is received into the buffer; changing state of a second counter whenever a request having said identified priority type is written out of the buffer; and comparing the states of the counters to determine if a request having the identified priority type is in the buffer.

According to a further aspect of the present invention there is provided a processor comprising a plurality of requester elements competing to access a resource through an arbiter element that controls access to the resource by the requester elements, at least one of the requester elements comprising: a control unit for generating requests, each request having a priority type selected from a plurality of different priority types for accessing the resource; a buffer unit connected to receive the generated requests from the control unit wherein requests are received into the buffer at a first clock signal and requests are written out of the buffer to the arbiter element at a second clock signal; a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

Preferably, a computer comprises the processor.

According to a further aspect of the present invention there is provided a computer comprising a plurality of requester elements competing to access a resource through an arbiter element that controls access to the resource by the requester elements, at least one of the requester elements comprising: a control unit for generating requests, each request having a priority type selected from a plurality of different priority types for accessing the resource; a buffer unit connected to receive the generated requests from the control unit wherein requests are received into the buffer at a first clock signal and requests are written out of the buffer to the arbiter element at a second clock signal; a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

According to a further aspect of the present invention there is provided a terminal competing to access a server over a communications network that controls access to the server, the terminal comprising: a control unit for generating requests, each request having a priority type selected from a plurality of different priority types for accessing the resource; a buffer unit connected to receive the generated requests from the control unit wherein requests are received into the buffer at a first clock signal and requests are written out of the buffer to the arbiter element at a second clock signal; a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

According to a further aspect of the present invention there is provided a server communicating with at least two terminals which are competing to access the server over a communications network that controls access to the server by the terminals, at least one of the terminals comprising: a control unit for generating requests, each request having a priority type selected from a plurality of different priority types for accessing the resource; a buffer unit connected to receive the generated requests from the control unit wherein requests are received into the buffer at a first clock signal and requests are written out of the buffer to the arbiter element at a second clock signal; a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

According to a further aspect of the present invention there is provided a system-on-chip device comprising a plurality of requester elements competing to access a resource through an on-chip communication bus that controls access to the resource by the requester elements, at least one of the requester elements comprising: an embedded CPU for generating DMA requests, each DMA request having a priority type selected from a plurality of different priority types for accessing the resource; a buffer unit connected to receive the generated DMA requests from the embedded CPU wherein DMA requests are received into the buffer at a first clock signal and DMA requests are written out of the buffer to the arbiter element at a second clock signal; a first counter that changes state whenever a DMA request having an identified priority type is received into the buffer; and a second counter that changes state whenever a DMA request having said identified priority type is written out of the buffer, wherein the states of the counters are compared to determine if a DMA request having the identified priority type is in the buffer unit.

BRIEF DESCRIPTION OF THE DRAWINGS

For a better understanding of the present invention and to show how the same may be carried into effect, reference will now be made by way of example to the accompanying drawings, in which.

It should be appreciated that where applicable the same reference numerals have been retained in order to refer to like elements.

DETAILED DESCRIPTION

Figure 5:
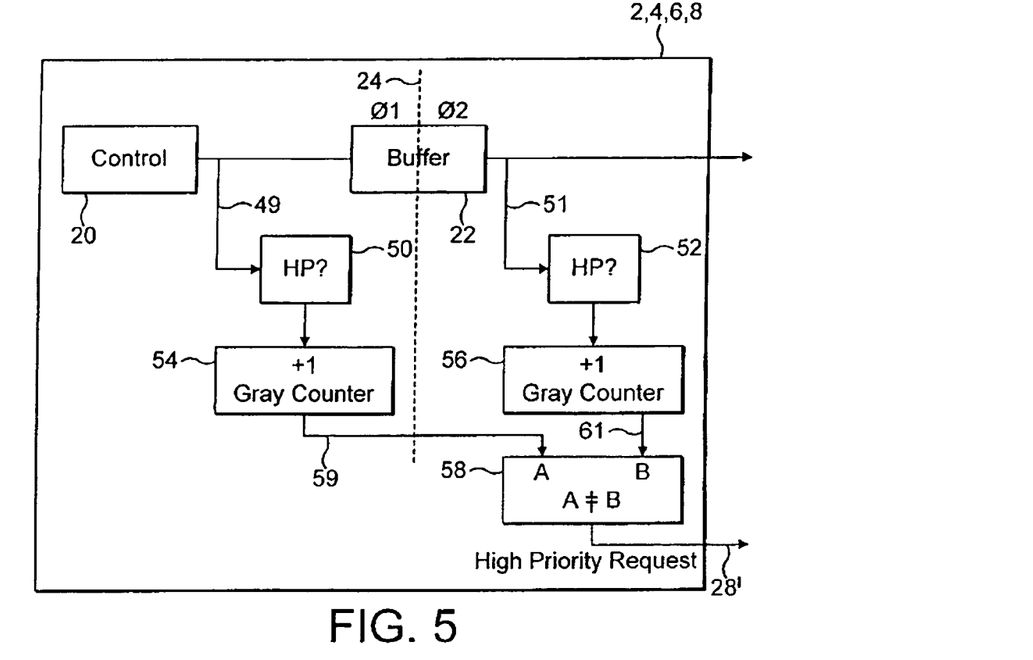
FIG. 5 shows the internal detail of a requester element according to an embodiment of the present invention.

FIG. 5 shows a preferred embodiment of the present invention which makes use of two gray counters 54, 56 and a comparator 58. Also checking units 50, 52 check to see if a high-priority request is being respectively read into, and out of, the buffer unit 22. The control unit 20 generates requests which are read into the buffer unit 22 at a first clock phase $\phi_1$. These requests are monitored by the check unit 50, and if any of the requests have a high-priority then a first gray counter 54 is incremented. Also, a checking unit 52 is connected via line 51 to monitor the requests as they are read out from the buffer unit 22 at the clock phase $\phi_2$. If any of the requests have a high-priority, then a second gray counter 56 is incremented.

The outputs of the respective gray counters are sent along lines 59 and 61 respectively to a comparator unit 58 having inputs A and B which are arranged to receive the corresponding outputs 59 and 61 from the gray counters. The inputs A and B of the comparator 58 are compared and if at any stage they are not equal this indicates that there is a high priority request located somewhere within the buffer unit 22. In such a situation, the high-priority request signal is asserted on line 28' for signaling to the arbiter element 10 that the buffer unit 22 of this requested element has a high priority request which needs to access the single resource 12.

Consider for example the case when the control unit has just begun to generate requests, for example having a sequence of two low-priority requests followed by a single high-priority request followed by more low-priority requests. In this case the first low-priority request will be entered into the buffer and the first gray counter is not incremented. Likewise, the second low-priority request is entered into the buffer 22 and the first gray counter is again not incremented. Then the single high-priority request is read into the buffer unit 22, which is detected by the checking unit 50 and the first gray counter is incremented to be at a certain value, which will be different from the second gray counter 52 (which is still at the original value, since no high-priority request has yet been read out of the buffer). Therefore, at this instant in time the value of the first gray counter 54 is found to be not equal to that of the second gray counter 56 by the comparator unit 58, and therefore a high priority request is asserted on line 28' indicating that a high-priority request is located in the buffer.

This causes the arbiter element to take the next request out of the buffer (whatever its actual priority) on a high priority basis, that is before other low or medium priority requests from other requester elements. At a later time, when the high-priority request is read out of the buffer unit 22, this is detected by the checking unit 52 which increments the second gray counter 56. At this point the values of the first and second gray counters are found to be equal by the comparator 58, which therefore deasserts the high priority request signal indicating that there is no longer a high priority request in the buffer unit 22.

In the embodiment of FIG. 5, it is shown that the first gray counter value is passed over the clock boundary 24 via line 59, and compared against the second gray counter value. However, it should be appreciated that in an alternative embodiment it is also possible that the second gray counter value is passed over the clock boundary 24, and compared against the first gray counter value in the first clock domain $\phi_1$.

The advantages of the embodiment shown in FIG. 5 can be described as follows:

The priority value can be stored in the buffer unit 22 as normal data (i.e. as it comes in with a normal request) and therefore direct access is not required (as was the case with the prior art shown in FIG. 4), thereby reducing the amount of silicon area required and the cost of the memory design.

Synchronization and metastability issues are handled by the gray count and the signal can be resynchronized as it crosses the clock boundary if required. That is, when crossing clock domains it is necessary to consider two issues: protocol synchronization and metastability.

Firstly, protocol synchronization needs to be considered whenever signals cross between two clock domains. It is important to choose an appropriate protocol to ensure that the transfer of information is correct and safe.

Consider the embodiment of FIG. 5, but instead of using the gray counters, the output of the high-priority test block (50) is passed straight across the clock boundary (24), and counted in $\phi_2$.

In such a situation, the embodiment of FIG. 5 will function correctly as long as $\phi_1 = \phi_2$ (i.e. both sides are running from the same clock). However, if $\phi_2$ is faster than $\phi_1$, the counter will count single requests multiple times. Alternatively, if $\phi_2$ is slower than $\phi_1$, some requests will be missed entirely.

Instead of using a single signal passed directly over the clock boundary, standard binary counters could be used. This solves the problem of different sampling frequencies, but introduces a different problem.

In this case, the control signals being transferred are binary count values, and in many cases, more than one bit of the control signal is changing at any one time. For example, FIG. 6 shows that when a binary counter is incremented from the state represented by decimal "5" (which is "0101" in binary) to the state represented by decimal "6" (which is "0110") at least two bits will need to change.

Since each one of these control signals will take a slightly different amount of time to reach its corresponding flip-flop in $\phi_2$. If the $\phi_2$ clock pulse arrives at the "wrong" moment, the logic in $\phi_2$ could store a value which is neither of the two count values—some bits could be the pre-incremented values, and others could be the post-incremented values.

Figure 6:
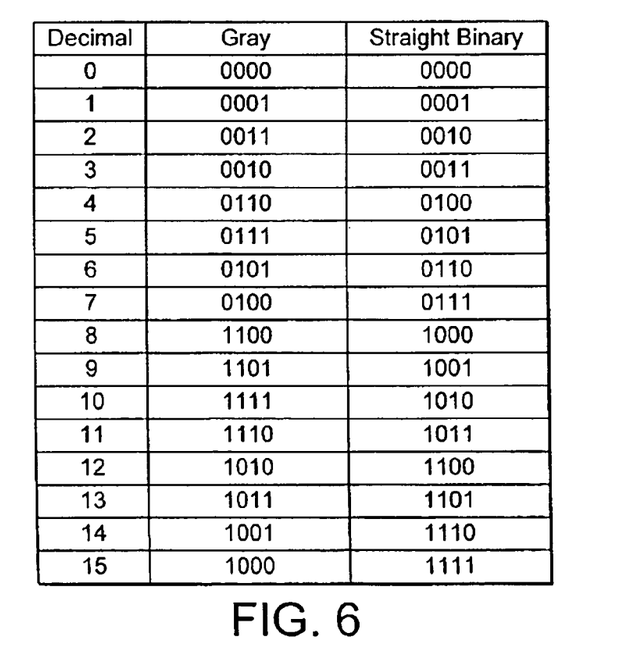
FIG. 6 shows a table indicating the difference between gray code and straight binary code.

FIG. 6 shows a table illustrating the differences between a gray count and a normal (straight) binary count. Gray code has the advantage that any change from one state to another, i.e. incrementing or decrementing from one state to another, only requires a single bit to change. For example, looking at the increment from the decimal value "5" to the decimal value "6" shown in FIG. 6 indicates that the gray counter changes from "0111" to "0101" and therefore only the third bit changes, i.e. from a "1" to a "0". Instead, for a binary counter, the binary code changes from "0101" to "0110" which requires two of the bits to change (i.e. the third and fourth bits).

Therefore, using gray codes overcomes the problem when multiple signals change (i.e. if binary counters are used) by ensuring that only one bit changes at a time, so it is impossible for the $\phi_2$ logic to store any value other than the two possible valid ones.

By using gray code counters, protocol synchronization issues have been resolved, however it is now necessary to consider metastability.

The concept of metastability can be understood by considering a register in which the input value changes asynchronously with respect to the clock. If the input value changes significantly before the clock edge, then the register will store the new value. However, if the input value changes significantly after the clock edge, then the register will use the old input value. Broadly speaking, metastability is concerned with the situation when the register input changes just as the clock edge arrives, in which case it is difficult to decide whether the register should store the new value or the old value.

Consider, by analogy, a ball being dropped over a knife edge. If the ball is dropped to one side of the edge, it will fall cleanly and quickly past the knife. However if the ball is dropped onto the edge itself, the ball will balance on the edge for a while before falling to one side. The closer to the center of the edge that the ball is dropped, the longer it will take to fall to one side. This is the same for flip-flops in which if the value changes too close to the clock edge, then the flip-flop can take a long time for the output to become stable.

Figure 9:
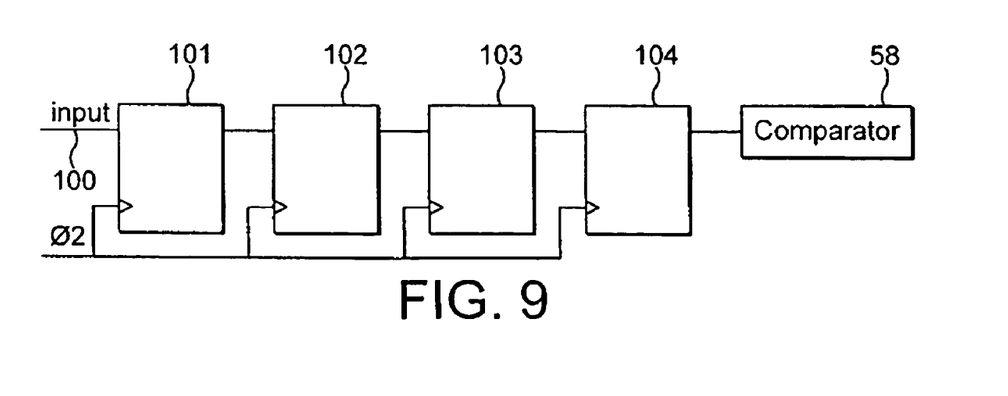
FIG. 9 shows a circuit for improving metastability according to an embodiment of the present invention.

The problems associated with metastability are reduced using statistical probability. That is, the output of the gray counter 54 is passed through a number of levels of flip-flops 101, 102, 103 and 104 (as shown in FIG. 9) before being used by the gray comparator 58. Thus FIG. 9 shows that an input signal 100 which is the output of the gray counter 54, and is received by the first flip-flop 101, and clocked out by $\phi_2$ to the second flip flop 102, and so on. That is, all four flip-flops are connected in series and are all clocked by $\phi_2$ so that the signal 100 which propagates through to the comparator has a low probability of experiencing metastability issues.

The probability that the input signal 100 will change close enough to the clock edge to cause a metastability condition is a finite value. This value can be calculated since one knows the amount of time between consecutive $\phi_2$ clock edges, and one knows the "setup" and "hold" values of the register (wherein "setup" is the last moment before the clock edge that the signal is allowed to change and "hold" is the earliest point after the clock edge that the signal is allowed to change). Thus it is possible to calculate the proportion of time for which a change in the input signal will cause a metastable condition.

The probability that a metastable condition in the first flip-flop 101 is still undecided by the time the clock edge arrives at the second flip-flop 102 is also known, since it is a function of the flip-flop 101 itself, and of the time between clock edges. For this example, it is assumed that this value is roughly 1 ppb (one in a billion) or $10^{-9}$.

The probability that a metastable condition in the second flip-flop 102 is still undecided by the time the clock edge arrives at the third flip-flop 103 is now 1 ppb×1 ppb=$10^{-18}$.

The probability that a metastable condition in the third flip-flop 103 is still undecided by the time the clock edge arrives at the fourth flip-flop 104 is now 1 ppb×1 ppb×1 ppb=$10^{-27}$.

Therefore, if $\phi_2$ is running at 1 GHz ($10^9$ Hz), there will be, on average, only one occasion every $10^{27}$ clock edges (or $10^{18}$ seconds) when the output of the fourth flip-flop 104 is metastable, which is considered acceptable.

Therefore, an advantage of using gray coding is that adequate protocol synchronization is achieved and this also allows us to use simple flip-flop retiming stages to remove metastability problems.

Thus, by increasing the number of flip-flop stages in series, the probability that a metastable condition will result is reduced.

The high-priority request signal 28' is deasserted as soon as the high priority request has been passed on to the arbiter element 10, thereby removing the need for the control unit 20 to handle the deassertion of the signal.

Figure 7A:
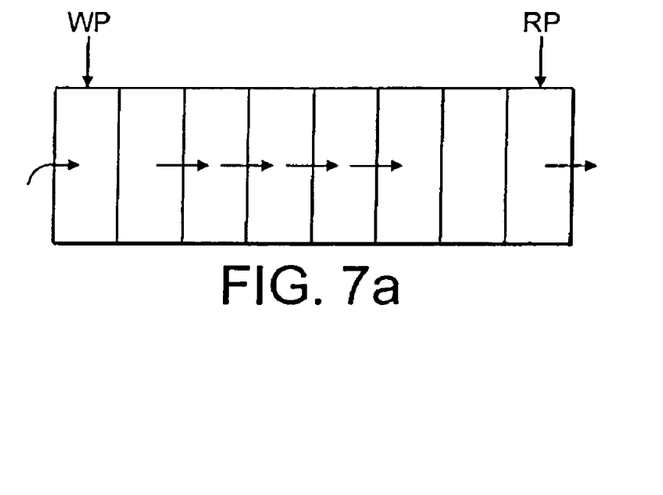
FIGS. 7A and 7B show FIFO buffer units corresponding to alternative embodiments of the present invention.
Figure 7B:
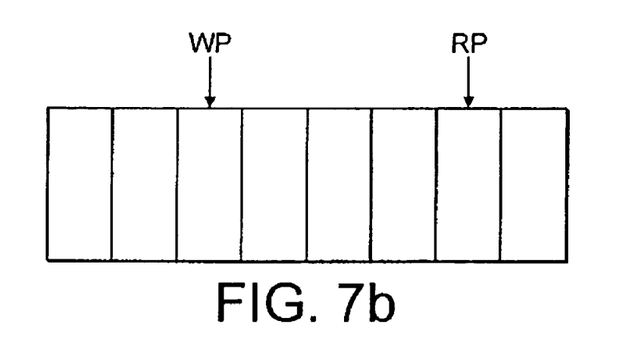

FIGS. 7A and 7B indicate respectively two possible embodiments for implementing the buffer unit 22 of the present invention. FIG. 7A shows a simple FIFO (first-in first-out) queue, wherein the buffer unit 22 comprises a plurality of storage locations (or slots) wherein requests generated by the control unit are shifted sequentially through the slots of the buffer unit in the order of arrival. That is, the requests are read into the left of the buffer and follow the arrows through sequential storage locations and are read out of the buffer in the same order that they arrive.

FIG. 7B shows an alternative embodiment using a read pointer (RP) and write pointer (WP). Again, the buffer unit is shown as comprising a plurality of storage locations, but in this case the RP determines at which location of the buffer unit the generated request should be read into, while the WP determines from which location in the buffer unit the next request should be read out of. The alternative embodiment shown in FIG. 7B does not necessarily store the requests into successive storage locations in the buffer, rather it uses the WP to identify an empty storage location. In any event, the RP and WP control the buffer unit to behave as a FIFO unit so that requests are read out in the order in which they arrived (i.e. the oldest request in the queue is read out first).

Figure 8:
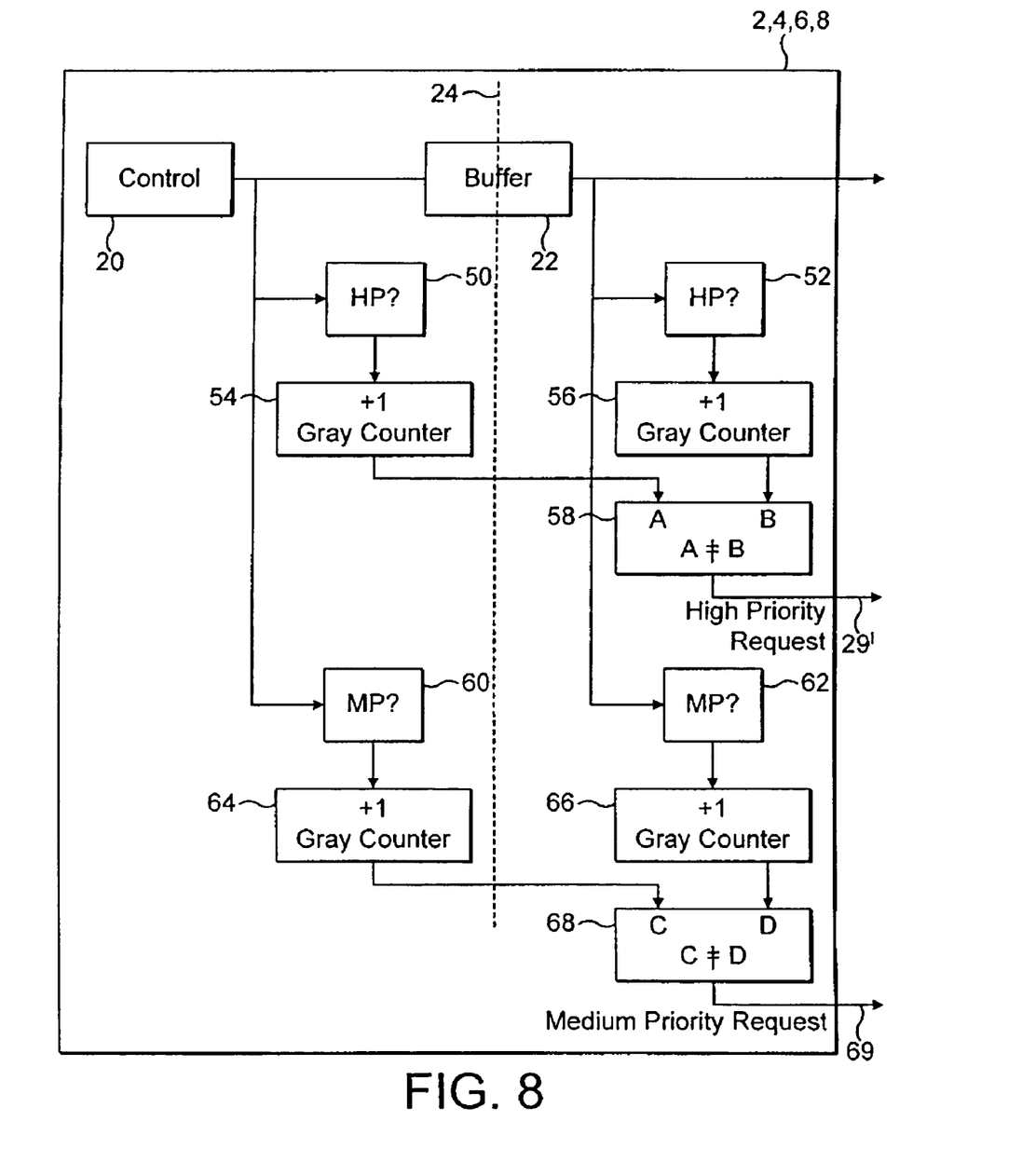
FIG. 8 shows an alternative embodiment of the present invention for detecting different priorities.

FIG. 8 shows an alternative embodiment of the present invention for detecting different priority types. That is, FIG. 8 shows the internal detail of the request element as further comprising a second pair of gray counter elements 64 and 66.

In this embodiment it is possible for the requester element 2, 4, 6, 8 to determine at any time whether there are any high-priority requests as well as any medium-priority requests in the queue 22. The high-priority requests are determined by the first pair of gray counters 54, 56 and the comparator 58, as already described.

In addition, the medium-priority requests are detected using a third checking unit 60 for checking whether a medium-priority request is written into the queue 22, and a fourth checking unit 62 for checking whether a medium-priority request is being read out of the queue 22. The checking units 60 and 62 are respectively connected to a third and a fourth gray counter 64, 66. When a medium-priority request is written into the queue 22 the third gray counter 64 is incremented, whereas when a medium-priority request is read out of the queue the fourth gray counter 66 is incremented. A second comparator 68 having two inputs, C and D, is arranged to receive the outputs of the third and fourth gray counters respectively. If C is not equal to D then there is a medium-priority request within the queue and this is signaled to the arbiter by asserting the signal on line 69, otherwise there is not a medium-priority request in the queue 22.

In this way multiple priority levels can be detected using multiple pairs of gray counters.

It should be appreciated that although the gray counters in the embodiments have been described as being incremented, alternative embodiments of the present invention also allow the gray counters to be decremented providing all the counters perform the same action, i.e. either increment or decrement.

It should be appreciated that not all of the requestor elements of a transaction based system as shown in the example of FIG. 1 need to be the same. For example, the system can have at least one requester element as described in the embodiments of FIG. 5 or FIG. 8, but wherein the system could, for example, further comprise:

1. One or more other requestor elements which will generate only one request at a time, so that no buffer unit 22 is required in these other requester elements, and which will always request at a single, fixed (per requestor) priority.

2. One or more other requestor elements which will generate only one request at a time, so that no buffer unit 22 is required in these other requester elements, and which will request different priorities for different transactions.

3. One or more other requester elements similar to the one described by the embodiment of FIG. 2 where the priority is fixed per requestor.

4. One or more other requester elements similar to the one described by the embodiments shown in FIG. 5 or FIG. 8.

That is, it should be appreciated that the transaction-based system could comprise a plurality of different types of requester elements.

Figure 1D:
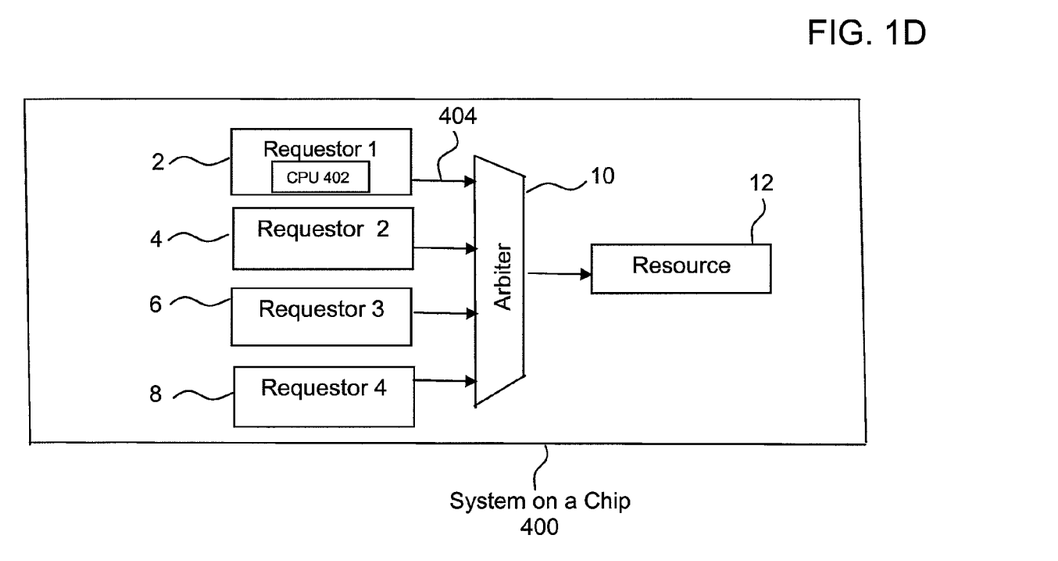

Embodiments of the present invention find particular application to be used in a SoC (System-on-Chip) device, where the "arbiter" component 10 of FIG. 1 is actually an on-chip bus. The requestor control block 2 is a small embedded CPU which is performing DMA (Direct Memory Access) operations inside the SoC. One example of such an implementation is illustrated in FIG. 1D, which shows an SoC 400 comprising a plurality of requestor elements 2, 4, 6, 8 competing for access to resource 12 and issuing DMA request 404, at least one of which comprises a CPU 402. Whereas some transactions might be large and latency tolerant (e.g. memory-memory transfers), others might be small, but require low latency, for example keeping a UART (Universal Asynchronous Receiver Transmitter) full of data. Since only one port to the on-chip bus is used, it is important that a small but urgent transfer is not held up behind a large, low priority transfer.

Embodiments of the present invention are able to be used for a digital TV set-top box SoC, which finds application for example in cable, satellite, terrestrial, DVD (Digital Video) and DTV (Digital TV) products.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A resource management system comprising a plurality of requester elements competing to access a resource through an arbiter element that controls access to the resource by the requester elements, at least one of the requester elements comprising:

a control unit for generating requests, each request having a priority type selected from a plurality of different priority types for accessing the resource;

a buffer unit connected to receive the generated requests from the control unit wherein requests are received into the buffer at a first clock signal and requests are written out of the buffer to the arbiter element at a second clock signal;

a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

2. The resource management system of claim 1, wherein if it is determined from comparing the states that a request having the identified priority type is in the buffer unit, a priority signal is asserted by that requester element to the arbiter element which determines the priority treatment of the requester element.

3. The resource management system of claim 2, wherein the priority signal when asserted causes the arbiter element to treat all requests in the buffer unit of the requester element with the same priority type as the identified priority type, whatever the actual priority types of those requests.

4. The resource management system of claim 3, wherein the identified priority type of the request is a high priority so that the arbiter element will grant access to the resource from those requests in the corresponding requester element before granting access to the resource from requests in the other requester elements.

5. The resource management system of claim 1, wherein the first and second clock signals are asynchronous.

6. The resource management system of claim 1, wherein the changes of state in the first and second counters are based on gray code.

7. The resource management system of claim 1, wherein the counters are gray counters which are incremented to change state.

8. The resource management system of claim 1, wherein the identified priority type is identified in the buffer by a first pair of counters comprising the first and second counters, and wherein at least one other priority type is identified in the buffer unit by a corresponding further pair of counters.

9. The resource management system of claim 1, wherein requests are written out of the buffer unit in the same order in which said requests were received by the buffer unit.

10. The resource management system of claim 1, wherein the buffer unit is a first-in first-out buffer.

11. A method for managing access to a resource wherein a plurality of requester elements are competing to access the resource through an arbiter element that controls access to the resource, the method comprising:

generating requests in each requester element to access the arbiter element, each request having a priority type selected from a plurality of different priority types for accessing the resource;

receiving the generated requests at a buffer in at least one requester element, wherein requests are received into the buffer at a first clock signal and requests are written out of the buffer to the arbiter element at a second clock signal;

changing state of a first counter whenever a request having an identified priority type is received into the buffer;

changing state of a second counter whenever a request having said identified priority type is written out of the buffer; and comparing the states of the counters to determine if a request having the identified priority type is in the buffer.

12. A processor comprising a plurality of requester elements competing to access a resource through an arbiter element that controls access to the resource by the requester elements, at least one of the requester elements comprising:

a control unit for generating requests, each request having a priority type selected from a plurality of different priority types for accessing the resource;

a buffer unit connected to receive the generated requests from the control unit wherein requests are received into the buffer at a first clock signal and requests are written out of the buffer to the arbiter element at a second clock signal;

a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

13. A computer comprising a processor according to claim 12.

14. A computer comprising a plurality of requester elements competing to access a resource through an arbiter element that controls access to the resource by the requester elements, at least one of the requester elements comprising:

a control unit for generating requests, each request having a priority type selected from a plurality of different priority types for accessing the resource;

a buffer unit connected to receive the generated requests from the control unit wherein requests are received into the buffer at a first clock signal and requests are written out of the buffer to the arbiter element at a second clock signal;

a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

15. A terminal competing to access a server over a communications network that controls access to the server, the terminal comprising:

a control unit for generating requests, each request having a priority type selected from a plurality of different priority types for accessing the resource;

a buffer unit connected to receive the generated requests from the control unit wherein requests are received into the buffer at a first clock signal and requests are written out of the buffer to the arbiter element at a second clock signal;

a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

16. A server communicating with at least two terminals which are competing to access the server over a communications network that controls access to the server by the terminals, at least one of the terminals comprising:

a control unit for generating requests, each request having a priority type selected from a plurality of different priority types for accessing the resource;

a buffer unit connected to receive the generated requests from the control unit wherein requests are received into the buffer at a first clock signal and requests are written out of the buffer to the arbiter element at a second clock signal;

a first counter that changes state whenever a request having an identified priority type is received into the buffer; and a second counter that changes state whenever a request having said identified priority type is written out of the buffer, wherein the states of the counters are compared to determine if a request having the identified priority type is in the buffer unit.

17. A system-on-chip device comprising a plurality of requester elements competing to access a resource through an on-chip communication bus that controls access to the resource by the requester elements, at least one of the requester elements comprising:

an embedded CPU for generating DMA requests, each DMA request having a priority type selected from a plurality of different priority types for accessing the resource;

a buffer unit connected to receive the generated DMA requests from the embedded CPU wherein DMA requests are received into the buffer at a first clock signal and DMA requests are written out of the buffer to the arbiter element at a second clock signal;

a first counter that changes state whenever a DMA request having an identified priority type is received into the buffer; and a second counter that changes state whenever a DMA request having said identified priority type is written out of the buffer, wherein the states of the counters are compared to determine if a DMA request having the identified priority type is in the buffer unit.

* * * * *